US009290089B2

(12) United States Patent
Xia et al.

(10) Patent No.: US 9,290,089 B2
(45) Date of Patent: Mar. 22, 2016

(54) FORECAST OF DRIVELINE LASH CONDITION FOR MULTIVARIABLE ACTIVE DRIVELINE DAMPING CONTROL

(75) Inventors: Houchun Xia, Troy, MI (US); Robert L. Morris, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 971 days.

(21) Appl. No.: 13/094,946

(22) Filed: Apr. 27, 2011

(65) Prior Publication Data

US 2012/0277963 A1 Nov. 1, 2012

(51) Int. Cl.

*G06F 17/00* (2006.01)
*B60K 6/365* (2007.10)
*B60K 6/445* (2007.10)
*B60W 40/12* (2012.01)

(52) U.S. Cl.

CPC ................. *B60K 6/365* (2013.01); *B60K 6/445* (2013.01); *B60W 40/12* (2013.01); *B60W 2510/1055* (2013.01); *Y02T 10/6239* (2013.01); *Y02T 10/84* (2013.01)

(58) Field of Classification Search

CPC ....... B60K 6/365; B60K 6/445; B60W 40/12; Y02T 10/84; Y02T 10/6239
USPC .......................................... 701/22, 51, 54, 58
See application file for complete search history.

(56) References Cited

U.S. PATENT DOCUMENTS

| | | | | |
|---|---|---|---|---|
| 7,577,507 | B2 | 8/2009 | Morris | |
| 7,983,160 | B2 * | 7/2011 | Gunatilake | 370/230.1 |
| 2009/0204280 | A1 * | 8/2009 | Simon et al. | 701/22 |

* cited by examiner

*Primary Examiner* — John Q Nguyen
*Assistant Examiner* — Rodney P King

(57) ABSTRACT

A method to predict a driveline lash condition includes monitoring an axle torque request signal, determining a predicted axle torque request value at a lead time based upon the monitored axle torque request signal, and predicting the driveline lash condition at the lead time based upon the predicted axle torque request value indicating an upcoming zero torque condition.

13 Claims, 3 Drawing Sheets

10
12
14
17
19
23
24
26
27
28
29
31
42
44
56
62
64
68
70
72
73
74
75
80
82
84
90
94

FORECAST OF DRIVELINE LASH CONDITION FOR MULTIVARIABLE ACTIVE DRIVELINE DAMPING CONTROL

TECHNICAL FIELD

This disclosure is related to control of a powertrain.

BACKGROUND

The statements in this section merely provide background information related to the present disclosure and may not constitute prior art.

Powertrains can utilize a variety of energy sources to provide power to a torque generative device of the powertrain. Electrical power can be provided from an energy storage device and the electrical power can be used to provide motive or propelling torque to an associated vehicle through the torque generative device.

Powertrains can utilize more than a single source of power. For example, a hybrid drive powertrain can utilize electrical power through a motor or motors and petroleum energy though a gasoline or diesel internal combustion engine. Other sources of energy are known including fuel cells and biodiesel or E85 fuels. Electrical power can be recovered through operation of the vehicle, for example, through regenerative braking. Further, electrical energy can be generated and stored in the energy storage device through directly driving a motor with an engine or driving an alternator, for example, as a belt driven device. Further, the energy storage device can be charged through a plug-in connection to an infrastructure power grid.

Driveline lash or gear lash occurs when torque being transmitted through a transmission or a portion of a transmission reverses. Lash is a result of manufacturing tolerances and wear upon the components of the powertrain. Lash causes perceptible negative impacts to vehicle driving performance resulting in issues such as a clunk, including an audible noise and/or a perceptible jerk. Lash occurs on powertrains utilizing a single torque generative device such as an internal combustion engine or a motor generator. However, as a plurality of torque generative devices are utilized, for example, in a hybrid drive powertrain, management of lash is an increasing concern caused by transitions between the torque generative devices and the addition of interactions within the transmission to support the torque generative devices. Actions wherein driveline torque is transitioned from a positive torque to a negative torque, or from a neutral torque to a positive or negative torque can result in gear lash as slack is taken out of the driveline and driveline components impact one another. Excessive gear lash, clunks, jerks, and other related events may result in operator dissatisfaction, and can negatively affect powertrain and transmission reliability and durability.

SUMMARY

A method to predict a driveline lash condition includes monitoring an axle torque request signal, determining a predicted axle torque request value at a lead time based upon the monitored axle torque request signal, and predicting the driveline lash condition at the lead time based upon the predicted axle torque request value indicating an upcoming zero torque condition.

BRIEF DESCRIPTION OF THE DRAWINGS

One or more embodiments will now be described, by way of example, with reference to the accompanying drawings, in which.

DETAILED DESCRIPTION

Figure 1:
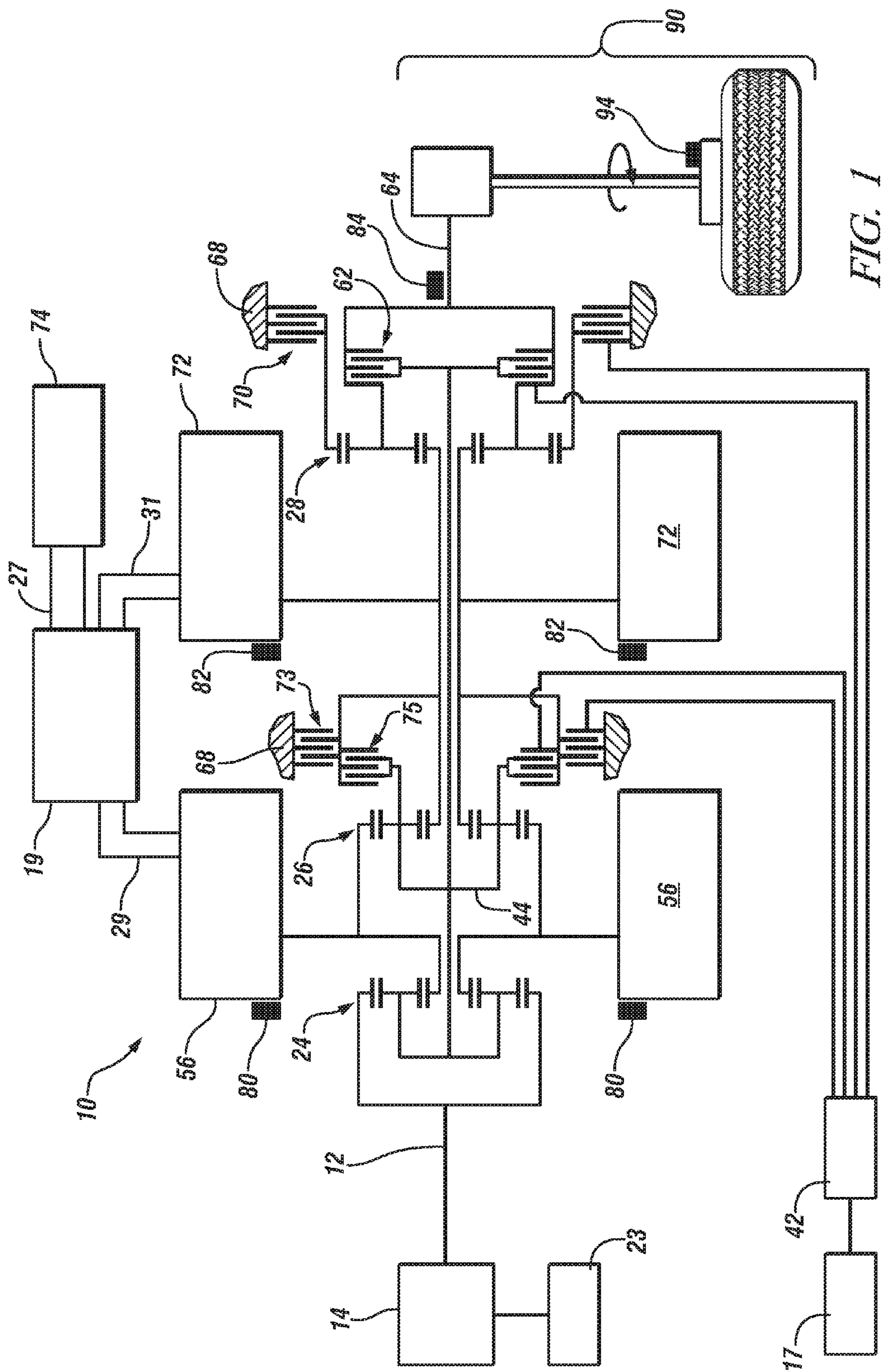
FIG. 1 illustrates an exemplary hybrid drive powertrain including an engine, transmission, driveline, control system, and hydraulic control circuit, in accordance with the present disclosure.

Referring now to the drawings, wherein the showings are for the purpose of illustrating certain exemplary embodiments only and not for the purpose of limiting the same, FIG. 1 illustrates an exemplary hybrid drive powertrain including an engine 14, transmission 10, driveline 90, control system, and hydraulic control circuit. Such an exemplary hybrid drive powertrain includes a plurality of torque generative devices operable in a powersplit mode wherein the various torque generative devices can selectively and cooperatively contribute torque to the powertrain. The transmission 10 includes an input shaft 12 having an input speed, $N_I$, and an output shaft 64 having an output rotational speed, $N_O$. The rotational speed of the output shaft 64 is preferably monitored using a sensing system 84.

The exemplary engine 14 includes a multi-cylinder internal combustion engine selectively operative in several states to transmit torque to the transmission via shaft 12, and can be either a spark-ignition or a compression-ignition engine. The engine 14 has a crankshaft having characteristic speed $N_E$ which is operatively connected to the transmission input shaft 12. The output of the engine, comprising speed $N_E$ and output torque $T_E$ can differ from transmission input speed $N_I$ and input torque $T_I$ when a torque management device is placed therebetween.

The transmission 10 utilizes three planetary gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 preferably comprise hydraulically-actuated rotating friction clutches. Clutches C1 and C3 preferably include hydraulically-actuated stationary devices grounded to the transmission case 68. Each clutch is preferably hydraulically actuated, receiving pressurized hydraulic fluid from a pump via an electro-hydraulic control circuit.

There is a first electric machine including a motor 56, referred to as MG-A, and a second electric machine including a motor 72, referred to as MG-B operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is connected to the inner gear of the first planetary gear set 24 and the outer gear of the second planetary gear set 26. The rotor for MG-B 72 is attached to a sleeve shaft hub. The resolver assemblies 80, 82 are appropriately positioned and assembled on MG-A 56 and MG-B 72. Each resolver assembly 80, 82 includes a known variable reluctance device including a resolver stator, operably connected to the stator of each electric machine, and a resolver rotor, operably connected to the rotor of each electric machine. Each resolver 80, 82 includes a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide motive output torque, $T_O$ to vehicle wheels. The driveline 90 includes a transfer case having a known axle ratio, which transmits torque to vehicle drive wheels. Each wheel of the vehicle, including the drive wheels and driven wheels, has a wheel speed sensing system 94 comprising one or more speed sensing devices mounted at the wheel and adapted to measure rotational speed of the respective wheel, including right-front (RF), right-rear (RR), left-front (LF), and left-rear (LR) wheels. The output of each wheel speed sensing system 94 is monitored by a brake control module.

The transmission 10 receives input torque from the torque-generative devices, including the engine 14, and MG-A 56 and MG-B 72, referred to as '$T_E$', '$T_A$', and '$T_B$' respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes a pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

The exemplary hybrid drive powertrain of FIG. 1 can utilize various combinations of engine 14 and motors 56 and 72 to provide torque to the driveline. The exemplary hybrid drive powertrain can have at least two operating modes, Mode1 and Mode2. Mode1 and Mode2 utilize operation of transmission 10 and associated planetary gear sets 24, 26, and/or 28 along with selective operation of associated clutches and motors 56 and 72 to enable a variable ratio of $N_I$ to $N_O$. An embodiment of Mode1 includes using one of motors 56 and 72 to provide torque to the powertrain to drive output shaft 64, while the engine 14 can be utilized separately to drive the other motor as a generator and provide electrical energy to the energy storage device 74. Another embodiment of Mode1 includes using one of motors 56 and 72 to provide output torque to the shaft 64 while the engine is turned off and stationary. An embodiment of Mode2 includes utilizing all of engine 14 and motors 56 and 72 to simultaneously provide torque to output shaft 64. Another exemplary embodiment of Mode2 includes utilizing one or both of motors 56 and 72 to provide torque to output shaft 64 while turning off engine 14 and allowing the engine to spin freely. In some embodiments, engine 14 can be operated to open all associated exhaust and intake valves to reduce pumping losses associated with spinning the engine while it is turned off. Another exemplary embodiment of Mode2 includes utilizing motors 56 and 72 to simultaneously provide torque to output shaft 64 while actively maintaining the engine speed equal to or near zero. Hybrid drive powertrains can take a number of embodiments, and a number of control schemes and resulting torque configurations can be achieved. The disclosure is not intended to be limited to the exemplary embodiments provided herein.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

A powertrain configured to provide torque to an axle is controlled according to an axle torque request signal. The actual torque delivered to the axle follows the axle torque request signal received in the powertrain. The axle torque request signal can be determined from an accelerator pedal position. Alternatively the axle torque request signal can be determined based upon a control signal such as a cruise control command. The axle torque request signal indicates a torque to which the powertrain is currently being requested to provide.

A current actual axle torque value can be estimated based upon operation of the powertrain as an axle torque estimate signal. A multivariable dynamic state estimator determining an axle torque estimate signal is disclosed in U.S. Pat. No. 7,577,507, which is incorporated herein by reference. Axle torque can be estimated by a number of methods known in the art, and the disclosure is not intended to be limited to the particular exemplary method described herein.

Figure 2:
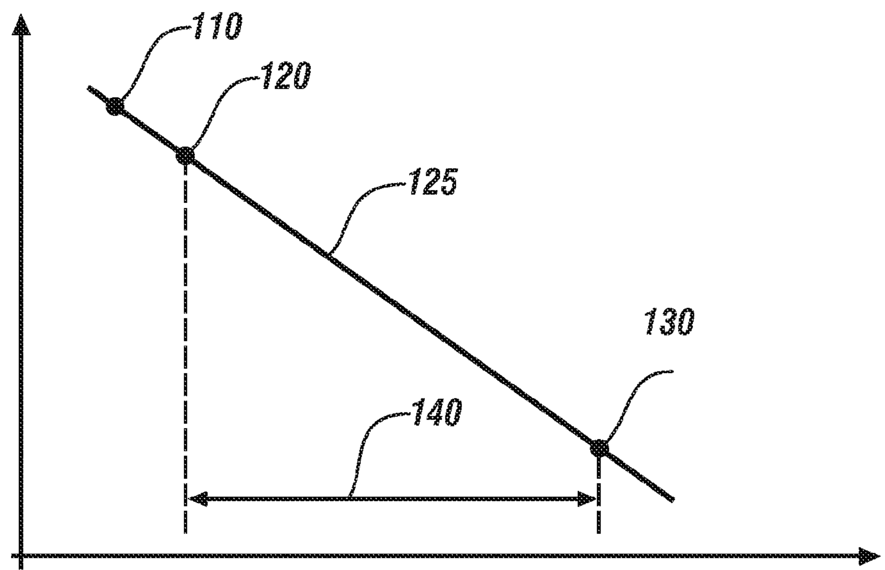
FIG. 2 illustrates an exemplary first-order prediction of axle torque request values, in accordance with the present disclosure.

An axle torque request signal can be utilized to determine a predicted axle torque request value or signal, predicting a real-time value at some lead time in the future. A number of methods to determine a predicted axle torque request signal are envisioned. A first-order prediction can be utilized, using a plurality of values of the axle torque request signal to plot a straight line prediction or a linear prediction of future axle torque request values. FIG. 2 illustrates an exemplary first-order prediction of axle torque request values. A horizontal x-axis is illustrated representing a time in seconds, and a vertical y-axis is illustrated representing increasing torque. A first axle torque request value 110 and a second axle torque request value 120 as can be monitored through an axle torque request signal are illustrated. Straight line 125 can be projected based upon values 110 and 120, and straight line 125 can be used to determine a predicted axle torque request value 130 based upon a selected lead time 140. Two axle torque request values 110 and 120 are illustrated with straight line 125 being defined by the two values. It will be appreciated that more than two axle torque request values can be monitored and a straight line can be defined by an average or best fit of the values according to methods known in the art.

Figure 3:
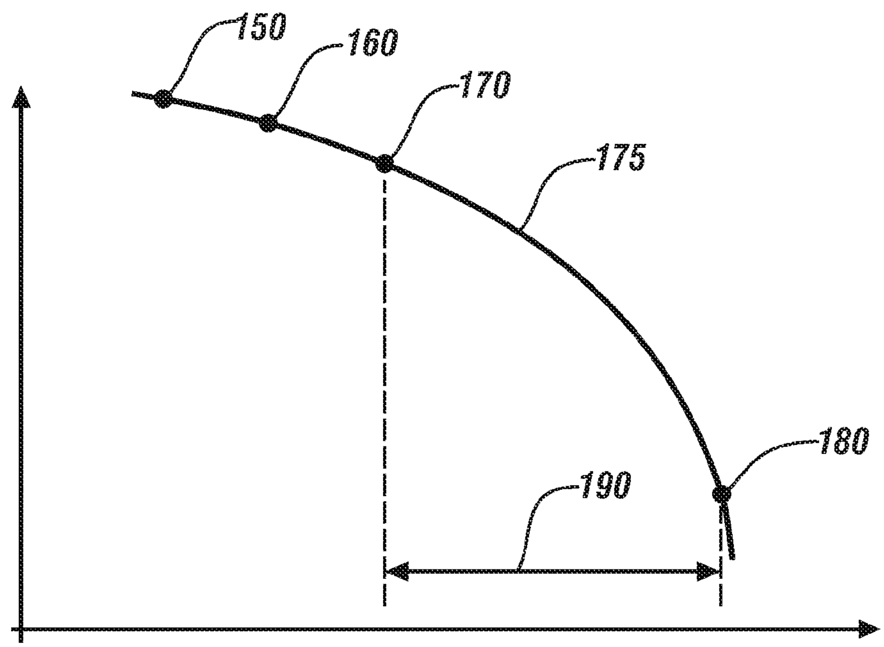
FIG. 3 illustrates an exemplary second-order prediction of axle torque request values, in accordance with the present disclosure.

A second-order or higher-order prediction can be utilized, using at least three values of the axle torque request signal to plot a curved, parabolic, or non-linear prediction of future axle torque request values in real-time. FIG. 3 illustrates an exemplary second-order prediction of axle torque request values. A horizontal x-axis is illustrated representing a time in seconds, and a vertical y-axis is illustrated representing increasing torque. A first axle torque request value 150, a second axle torque request value 160, and a third axle torque request value 170 as can be monitored through an axle torque request signal are illustrated. Curved line 175 can be projected based upon values 150, 160, and 170, and curved line 175 can be used to determine a predicted axle torque request value 180 based upon lead time 190. Three axle torque request values 150, 160, and 170 are illustrated with curved line 175 being defined as a parabolic curve defined by the three values. In one embodiment, curved line 175 can be determined by a polynomial extrapolation method known in the art. It will be appreciated that more than three axle torque request values can be monitored and a curved line can be defined by an average or best fit of the values using a parabolic curve or other representative curve form according to methods known in the art. Similarly, other forms of prediction can be used based upon the axle torque request signal according to methods of prediction known in the art. For various forms of predictions, a filter can be utilized to condition axle torque request values to create a filtered axle torque request signal for use in predicting axle torque request values.

Driveline lash occurs when torque acting upon a portion of a transmission or a gear set reaches or crosses a zero torque condition. By monitoring requested torque and actual or current torque in the relevant components of the transmission, a prediction can be made when the zero torque condition is likely to be reached. For example, in a first case where the current axle torque estimate has a positive value and either the current torque request or the predicted torque request has a negative value, actual axle torque is controlled to follow the requested torque or the predicted requested torque to cross the zero torque condition from the positive value to the negative value. Similarly, in a second case where the current axle torque estimate has a negative value and either the current torque request or the predicted torque request has a positive value, the actual axle torque is controlled to follow the requested torque or the predicted requested torque to cross the zero torque condition from the negative value to the positive value. Therefore, a lash condition can be predicted based upon the sign of a current axle torque estimate value and the sign of a current torque request value or the sign of a predicted torque request value.

A method to predict a driveline lash condition at some lead time in the future includes predicting an axle torque request value at the lead time in the future and predicting the driveline lash condition based upon the predicted axle torque request value. If the predicted axle torque request value is less than zero or less than a torque prediction threshold value, then the driveline lash condition can be predicted. The method can include predicting axle torque request values in the future according to a plurality of predictions and predicting the driveline lash condition based upon any of the plurality of predictions indicating the driveline lash condition. When the current axle torque estimate is positive, the predicted axle torque request value, predicted by a first order prediction, a second order prediction, a combination of a first order prediction and a second order prediction, or by other prediction method, at a lead time is compared to a positive torque prediction threshold value equal to zero or close to the zero torque value. If the predicted axle torque request value is less than the positive torque prediction threshold value, then the predicted axle torque request value can be said to negative or close enough to zero to predict that a driveline lash condition is likely.

Furthermore, a plurality of torque conditions relative to a plurality of torque thresholds can be used to improve the fidelity of the driveline lash prediction. In a first example of a torque condition that can be used to improve the fidelity of the prediction, proximity of a current axle torque estimate to the zero torque condition can be used to predict a possible zero torque crossing. For example, the current axle torque estimate value with a positive value or sign must be in the proximity of a zero torque value in order to predict a possible zero torque crossing condition. The proximity to the zero torque condition can be defined by a current axle torque estimate value that is within a low axle torque estimate range defined by a positive minimum torque threshold value and a positive maximum torque threshold value. If the current axle torque estimate value is within the range defined by the positive minimum torque threshold value and the positive maximum torque threshold value, then the current axle torque estimate can be said to be positive and close to zero, indicating that a prediction of a possible zero torque crossing in the near future can be appropriate.

In a second example of a torque condition that can be used to improve the fidelity of the prediction, a current axle torque request value may be compared to a positive torque request threshold value close to the zero torque value, and if the current axle torque request value is less than the positive torque request threshold value, then the current axle torque request can be said to be negative or close enough to zero to indicate that a prediction of a possible zero torque crossing in the near future is appropriate.

The above torque conditions that can be used to improve fidelity of the prediction in isolation or combination with the predicted axle torque request value. An exemplary method determines a driveline lash condition based upon the predicted axle torque request being less than the positive torque prediction threshold value, the current axle torque estimate being greater than the positive minimum torque threshold value and less than the positive maximum torque threshold value, and the current axle torque request being less than the positive torque request threshold value.

Similarly, to predict a possible zero torque crossing of an axle torque from a negative value to a positive value, when the current axle torque estimate is negative, the predicted axle torque request value, predicted by a first order prediction, a second order prediction, a combination of a first order prediction and a second order prediction, or by other prediction method, at a lead time is compared to a negative torque prediction threshold value equal to zero or close to the zero torque value. If the predicted axle torque request value is greater than the negative torque prediction threshold value, then the predicted axle torque request value can be said to positive or close enough to zero to predict that a driveline lash condition is likely. Similarly, this driveline lash prediction can be improved by comparing the current axle torque estimate value to a range in the proximity of a zero torque value defined by a negative minimum torque threshold value and a negative maximum torque threshold value. Similarly, the driveline lash prediction can be improved by comparing the current axle torque request value to a negative torque request threshold value close to the zero torque value and determining if the axle torque request value is greater than the negative torque request threshold value.

The positive torque prediction threshold value, negative torque prediction threshold value, positive minimum torque threshold value, positive maximum torque threshold value, negative minimum torque threshold value, the negative maximum torque threshold value, positive torque request threshold value, and negative torque request threshold value can be selected by experimentation, calculation, modeling, or any other method sufficient to contemplate operation of the powertrain, and a plurality of values for the thresholds can be implemented based upon operating conditions.

Figure 4:
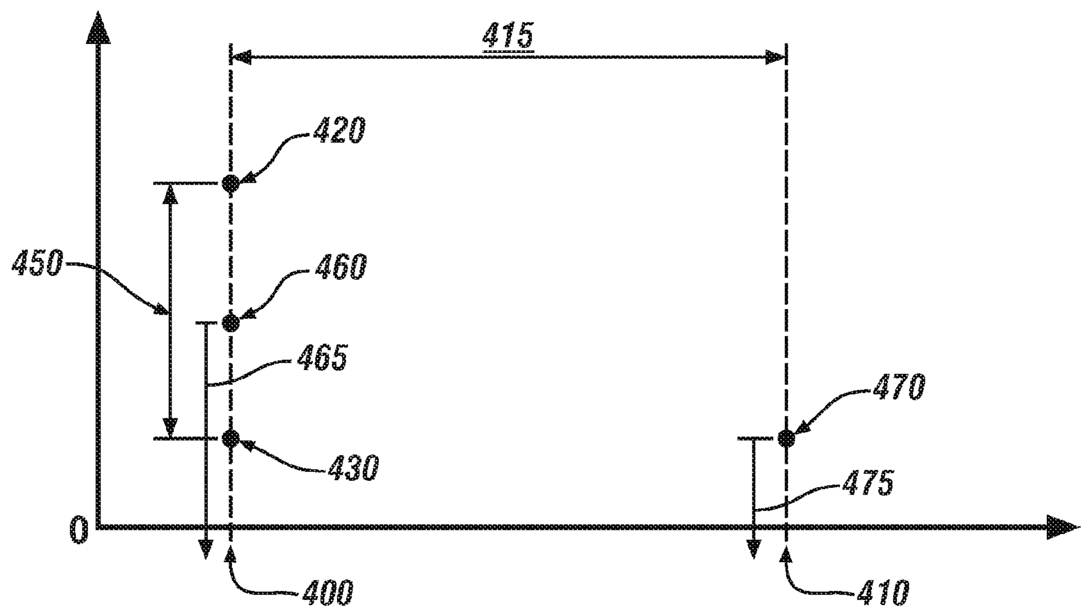
FIG. 4 illustrates exemplary threshold values used for predicting a possible zero torque crossing of an actual axle torque from a positive value to a negative value, in accordance with the present disclosure.

FIG. 4 illustrates exemplary threshold values used for predicting a possible zero torque crossing of an actual axle torque from a positive value to a negative value. A horizontal x-axis illustrates time in seconds, and a vertical y-axis illustrates axle torque. A time 400 at a current time and a time 410 at a future time, advanced from time 400 by lead time 415, are illustrated. A range 450 is defined by a positive minimum torque threshold value 430 and a positive maximum torque threshold value 420. Range 450 can be compared to a current axle torque estimate. A positive torque request threshold value 460 defines a range 465 in which a current axle torque request can be determined to be close to zero or negative. A positive torque prediction threshold value 470 defines a range 475 in which a predicted axle torque request can be determined to be close to zero or negative.

A combination of the above methods may indicate a driveline lash condition according to a number of configurations. For example, a method can include monitoring an axle torque estimate signal, monitoring an axle torque request signal, predicting a first predicted axle torque request value at a first lead time using at least two values of the axle torque request signal for a linear prediction of the axle torque request value, predicting a second predicted axle torque request value at a second lead time using at least three values of the axle torque request signal for a nonlinear prediction of the axle torque request value, and predicting the driveline lash condition based upon a current axle torque estimate value being positive and within a near zero range, the monitored axle torque request value being less than a positive torque request threshold value, and one of the predicted axle torque request values being less than a positive torque prediction threshold value. Each of the predicted axle torque request values can be compared to a common threshold value selected to indicate proximity to or crossing of the zero torque condition. Alternatively, each of the predicted axle torque request values can be compared to a different threshold value selected for the respective method to predict the value. The method can include using a current axle torque estimate signal, for example, as determined by a multivariable dynamic state estimator and predicting the driveline lash condition only if the axle torque estimate is within a calibrated range close to a zero torque value or a low axle torque estimate range.

Once a driveline lash condition is predicted, corrective measures can be commanded or utilized to mitigate or reduce the impact of the predicted driveline lash condition to vehicle driving performance and/or the life of powertrain components. For example, the torque provided to the axle can be reduced to mitigate clunks and other perceptible effects of the driveline lash condition.

Figure 5:
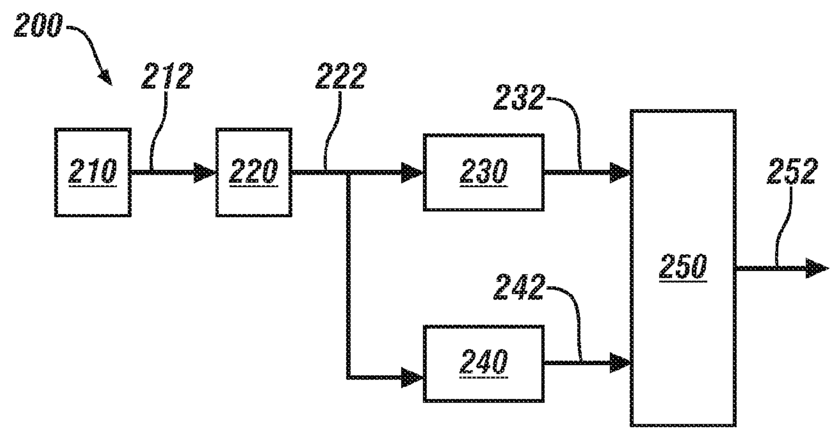
FIG. 5 illustrates an exemplary configuration to predict a driveline lash condition based upon a plurality of predicted axle torque request values, in accordance with the present disclosure.

FIG. 5 illustrates an exemplary configuration to predict a driveline lash condition based upon a plurality of predicted axle torque request values. Configuration 200 includes axle torque request module 210, which monitors an accelerator pedal sensor or other device that generates an axle torque request signal. Module 210 outputs the monitored axle torque request signal 212 to a low pass filter 220, which outputs a filtered axle torque request signal 222. Signal 222 is input to a first axle torque request prediction module 230 which outputs a first predicted axle torque request signal 232 predicted at a first lead time. Signal 222 is also input to a second axle torque request prediction module 240 which outputs a second predicted axle torque request signal 242 predicted at a second lead time. The first and second lead times can be used to predict axle torque request values at different lead times in the future, or the first and second lead times can be an identical lead time to improve the prediction accuracy. First predicted axle torque request signal 232 and second predicted axle torque request signal 242 are input to module 250, wherein methods disclosed herein are employed to determine whether a lash condition can be predicted. If a lash condition is predicted, lash condition prediction signal 252 is generated by module 250 for use by other powertrain control modules to determine appropriate control actions for driveline in lash condition. Module 250 can have additional inputs including a current axle torque estimate and a monitored axle torque request.

Figure 6:
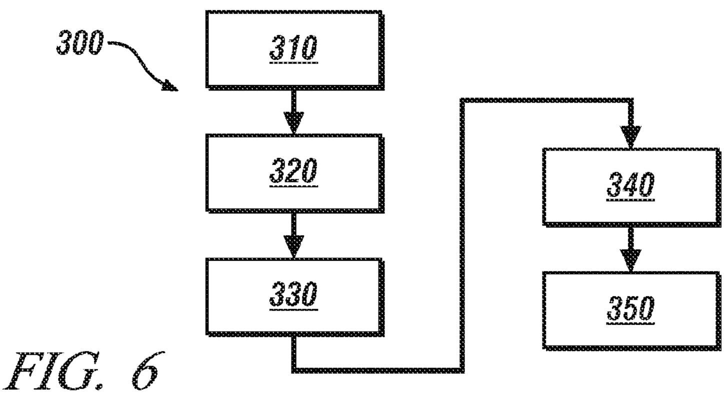
FIG. 6 illustrates an exemplary process for predicting a driveline lash condition, in accordance with the present disclosure.

FIG. 6 illustrates an exemplary process for predicting a driveline lash condition. Table 1 includes contents of the depicted process.

TABLE 1

| Block | Description |
|---|---|
| 310 | Monitor an Axle Torque Estimate Signal |
| 320 | Monitor an Axle Torque Request Signal |
| 330 | Predict a First Predicted Axle Torque Request Value |
| 340 | Predict a Second Predicted Axle Torque Request Value |
| 350 | Predicting the Driveline Lash Condition Based upon the Axle Torque Estimate Signal, the Axle Torque Request Signal, and the Predicted Axle Torque Request Values |

Process 300 begins at block 310, wherein an axle torque estimate signal originating from a device estimating the axle torque or transmission output torque in the powertrain is monitored. This device can include a multivariable dynamic state estimator disclosed herein or other similar device. At block 320, an axle torque request signal originating from an accelerator pedal device, a cruise control module, or other device is monitored. At block 330, a first predicted axle torque request value is predicted based upon the monitored and filtered axle torque request signal. At block 340, a second predicted axle torque request value is predicted based upon the monitored and filtered axle torque request signal. At block 350, a driveline lash condition is predicted based upon the axle torque estimate signal, the axle torque request signal, and the predicted axle torque request values as disclosed herein.

The driveline lash condition, once predicted, can be sustained through a period of time calibrated or determined to include at least the lead time and additional necessary time, the sum including a minimum lash hold time, for controller to take appropriate action. Once a measured lash condition time span or the time that the lash condition has been active exceeds the minimum lash hold time, the driveline lash condition can be exited based upon the current axle torque estimate exceeding a calibrated recovery axle torque estimate threshold.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to predict a driveline lash condition for a powertrain, the method comprising:

monitoring a series of current axle torque request signal values;

predictively determining an axle torque request value at a lead time based upon the series of current axle torque request signal values;

predicting, using a controller, the driveline lash condition at the lead time based upon the predictively determined axle torque request value indicating an upcoming zero torque condition;

and further comprising monitoring a current axle torque estimate signal; and determining the current axle torque estimate signal to indicate one of a positive current axle torque and a negative current axle torque;

wherein, if the current axle torque estimate signal is determined to indicate the positive current axle torque, predicting the driveline lash condition at the lead time comprises:

comparing the predictively determined axle torque request value to a positive torque prediction threshold value; and predicting the driveline lash condition based upon the predictively determined axle torque request value being less than the positive torque prediction threshold value; and wherein, if the current axle torque estimate signal is determined to indicate the negative current axle torque, predicting the driveline lash condition at the lead time comprises:

comparing the predictively determined axle torque request value to a negative torque prediction threshold value; and predicting the driveline lash condition based upon the predictively determined axle torque request value being greater than the negative torque prediction threshold value;

controlling the powertrain based upon the predicted driveline lash condition.

2. The method of claim 1:

wherein, if the current axle torque estimate signal is determined to indicate the positive current axle torque, predicting the driveline lash condition at the lead time further comprises:

comparing the current axle torque estimate signal to a range defined by a positive minimum torque threshold value and a positive maximum torque threshold value;

comparing the current axle torque request signal values to a positive torque request threshold value; and predicting the driveline lash condition further based upon the current axle torque estimate signal being within the range defined by the positive minimum torque threshold value and the positive maximum torque threshold value and the current axle torque request signal values being less than the positive torque request threshold value; and wherein, if the current axle torque estimate signal is determined to indicate the negative current axle torque, predicting the driveline lash condition at the lead time further comprises:

comparing the current axle torque estimate signal to a range defined by a negative minimum torque threshold value and a negative maximum torque threshold value;

comparing the current axle torque request signal values to a negative torque request threshold value; and predicting the driveline lash condition further based upon the current axle torque estimate signal being within the range defined by the negative minimum torque threshold value and the negative maximum torque threshold value and the current axle torque request signal values being greater than the negative torque request threshold value.

3. The method of claim 1, wherein predictively determining the axle torque request value at the lead time comprises:

utilizing a first-order prediction based upon a plurality of values of the current axle torque request signal values to linearly predict the axle torque request value at the lead time.

4. The method of claim 1, wherein predictively determining the axle torque request value at the lead time comprises:

filtering the current axle torque request signal values to generate a filtered axle torque request signal; and utilizing a first-order prediction based upon a plurality of values of the filtered axle torque request signal to linearly predict the axle torque request value at the lead time.

5. The method of claim 1, wherein predictively determining the axle torque request value at the lead time comprises:

utilizing a second-order prediction based upon at least three values of the current axle torque request signal values to non-linearly predict the axle torque request value at the lead time.

6. The method of claim 1, wherein predictively determining the axle torque request value at the lead time comprises:

filtering the current axle torque request signal values to generate a filtered axle torque request signal; and utilizing a second-order prediction based upon at least three values of the filtered axle torque request signal to non-linearly predict the axle torque request value at the lead time.

7. The method of claim 1, wherein predicting the driveline lash condition at the lead time based upon the predictively determined axle torque request value indicating the upcoming zero torque condition comprises:

predicting the driveline lash condition based upon comparing the predictively determined axle torque request value to a torque prediction threshold value.

8. The method of claim 7, further comprising:

monitoring a current axle torque estimate signal; and wherein predicting the driveline lash condition is further based upon the current axle torque estimate signal being within a low axle torque estimate range.

9. The method of claim 8, wherein predicting the driveline lash condition is further based upon comparing the monitored current axle torque request signal values to a torque request threshold value.

10. The method of claim 7, wherein predicting the driveline lash condition is further based upon comparing the monitored current axle torque request signal values to a torque request threshold value.

11. The method of claim 1, wherein controlling the powertrain based upon the predicted driveline lash condition comprises commanding corrective measures to mitigate effect of the predicted driveline lash condition.

12. The method of claim 11, further comprising:

monitoring a current axle torque estimate signal; and ceasing commanding the corrective measures based upon a lash condition time span exceeding a minimum lash hold time and the current axle torque estimate signal exceeding a recovery axle torque estimate threshold.

13. Method to predict a vehicle driveline lash condition, the method comprising:

monitoring a current axle torque estimate signal;

monitoring a series of current axle torque request signal values;

filtering the current axle torque request signal values to generate a filtered axle torque request signal;

predictively determining a first axle torque request value at a first lead time using two values of the filtered axle torque request signal to determine a real-time linearly predicted axle torque request value;

predictively determining a second axle torque request value at a second lead time using three values of the filtered axle torque request signal to determine a real-time non-linearly predicted axle torque request value;

predicting the driveline lash condition based upon the current axle torque estimate signal being within a low axle torque estimate range, the current axle torque request signal values being less than a torque request threshold value, and one of the first and second predictively determined axle torque request values being less than a torque prediction threshold value;

commanding, using a controller, corrective measures based upon predicting the driveline lash condition; and ceasing the corrective measures based upon a lash condition time span exceeding a minimum lash hold time and the current axle torque request signal values exceeding a calibrated recovery axle torque estimate threshold.

* * * * *